(12) United States Patent
Park et al.

(10) Patent No.: US 7,689,960 B2
(45) Date of Patent: Mar. 30, 2010

(54) PROGRAMMABLE VIA MODELING

(75) Inventors: Jonathan Park, San Jose, CA (US); Yit Ping Kok, Raub (MY); Soon Chieh Lim, Gelutor (MY); Yin Hao Liew, Bayan Lepas (MY); Wai Leng Chek, Gelutor (MY)

(73) Assignee: eASIC Corporation, Santa Clara, CA (US)

( * ) Notice: Subject to any disclaimer, the term of this patent is extended or adjusted under 35 U.S.C. 154(b) by 543 days.

(21) Appl. No.: 11/338,804

(22) Filed: Jan. 25, 2006

(65) Prior Publication Data

US 2007/0174801 A1 Jul. 26, 2007

(51) Int. Cl.
*G06F 17/50* (2006.01)

(52) U.S. Cl. .......... 716/8; 716/9; 716/10; 716/11; 703/14; 257/209; 257/529; 257/530

(58) Field of Classification Search ............ 716/8–11; 703/14; 257/209, 529–530
See application file for complete search history.

(56) References Cited

U.S. PATENT DOCUMENTS

| | | | | |
|---|---|---|---|---|
| 3,983,408 | A * | 9/1976 | Adam et al. ................ 377/58 |
| 4,912,348 | A * | 3/1990 | Maki et al. ................ 326/113 |
| 5,068,603 | A * | 11/1991 | Mahoney .................. 714/726 |
| 5,321,322 | A * | 6/1994 | Verheyen et al. ............ 326/41 |
| 5,371,390 | A * | 12/1994 | Mohsen .................... 257/209 |
| 5,377,124 | A * | 12/1994 | Mohsen .................... 716/16 |
| 5,430,605 | A * | 7/1995 | deNeuf et al. ............ 361/321.1 |
| 5,537,108 | A * | 7/1996 | Nathan et al. ............. 257/529 |
| 5,666,288 | A | 9/1997 | Jones et al. |
| 5,675,502 | A * | 10/1997 | Cox ............................. 716/6 |
| 5,815,404 | A * | 9/1998 | Goetting et al. ............ 716/16 |
| 5,886,597 | A * | 3/1999 | Riad ......................... 333/245 |
| 6,194,912 | B1 | 2/2001 | Or-Bach |
| 6,209,123 | B1 * | 3/2001 | Maziasz et al. ............. 716/14 |
| 6,288,437 | B1 * | 9/2001 | Forbes et al. ............... 257/530 |
| 6,301,696 | B1 | 10/2001 | Lien et al. |
| 6,331,790 | B1 * | 12/2001 | Or-Bach et al. ............ 326/41 |
| 6,338,158 | B1 | 1/2002 | Payne |
| 6,490,707 | B1 | 12/2002 | Baxter |
| 6,631,510 | B1 * | 10/2003 | Betz et al. ................. 716/16 |
| 6,686,768 | B2 * | 2/2004 | Comer ...................... 326/38 |
| 6,804,808 | B2 * | 10/2004 | Li et al. ..................... 716/5 |
| 6,879,949 | B2 * | 4/2005 | Scherr ...................... 703/14 |

(Continued)

OTHER PUBLICATIONS

International Search Report and Written Opinion from the International Searching Authority and issued in connection with corresponding International Application No. PCT/US07/001484 on Feb. 5, 2008.

*Primary Examiner*—Naum B Levin
(74) *Attorney, Agent, or Firm*—Connolly Bove Lodge & Hutz LLP (57) ABSTRACT

A method for verifying library components and designs on a via customizable ASIC, which may include the process of adding capacitors to model possible via sites of a model of an un-customized portion of or a whole ASIC, and replacing the capacitors with resistors to model where custom vias have been placed on the ASIC to implement a desired component or design. Views of this model may then be generated to verify the functionality of the component or design, and component models for timing, function and via customization may then be generated for the component library.

8 Claims, 11 Drawing Sheets

U.S. PATENT DOCUMENTS

| | | | |
|---|---|---|---|
| 6,937,508 B1 * | 8/2005 | Hakkarainen | 365/171 |
| 6,950,894 B2 * | 9/2005 | Tan et al. | 710/300 |
| 6,961,919 B1 * | 11/2005 | Douglass | 716/18 |
| 7,098,691 B2 * | 8/2006 | Or-Bach et al. | 326/47 |
| 7,123,118 B2 * | 10/2006 | McKinzie, III | 333/219 |
| 7,129,744 B2 * | 10/2006 | Madurawe | 326/38 |
| 7,176,713 B2 * | 2/2007 | Madurawe | 326/38 |
| 7,210,115 B1 * | 4/2007 | Rahim et al. | 716/16 |
| 7,278,120 B2 * | 10/2007 | Rahmat et al. | 716/2 |
| 7,317,345 B2 * | 1/2008 | Sanchez et al. | 327/527 |
| 2002/0031041 A1 * | 3/2002 | Kuge et al. | 365/233 |
| 2003/0121019 A1 | 6/2003 | Brown et al. | |
| 2004/0105207 A1 * | 6/2004 | Spaderna et al. | 361/115 |
| 2005/0091630 A1 * | 4/2005 | Madurawe | 716/16 |
| 2005/0149898 A1 | 7/2005 | Hakewill et al. | |
| 2005/0234684 A1 * | 10/2005 | Sawicki et al. | 703/1 |
| 2007/0080709 A1 * | 4/2007 | Or-Bach et al. | 326/38 |

* cited by examiner

PROGRAMMABLE VIA MODELING

FIELD OF THE INVENTION

The present invention relates to integrated circuit devices as well as to methods for personalizing, programming and testing such devices.

BACKGROUND OF THE INVENTION

The following U.S. patents are believed to represent the current state of the art: U.S. Pat. Nos. 6,331,790, 6,194,912, 5,666,288, 6,490,707 and 6,301,696. These patents all relate to prior art with respect to the current patent.

U.S. Pat. Nos. 6,331,790, and 6,184,912 describe semiconductor devices, which contain logic cells that further contain look up tables and interconnects, which may be patterned by a single via mask. The advantages of such application-specific integrated circuits (ASICs) have been clearly defined in the prior art. Other of the above patents describe methods for converting field programmable gate array (FPGA) devices into mask defined devices called application specific integrated circuits (ASICs). By their very nature these methods convert the programmable interconnect information of an FPGA design into some corresponding mask based information for the equivalent ASIC design, but do not deal with the verification and modeling of single via mask customization.

In both ASICs and FPGAs, it is common to provide a library of components, from which the designer may select and instantiate into a design. That is, a library component may be used as portion of a design of a device. In ASICs, these library components are typically implemented out of custom designed transistors and metal interconnects that require a full set of masks to fabricate. In FPGAs, these components are typically implemented by configuring a fixed preexisting set of switches and logic functions. In either case, appropriate functional, physical and timing models may be generated for the library of components in order for the user to verify the function, layout and timing of their design. In ASICs, this may be done by designing the specific transistors and metal interconnects for the component and extracting the necessary library information from implementations and simulations of that component design. In FPGAs a basic template or cell may be custom designed, from which the basic physical and timing information may be obtained. The specific functional, physical and timing models of a component are then derived from implementation and simulation of the configured cell or cells of the component.

In U.S. Pat. No. 6,490,707, granted Dec. 3, 2002, Baxter teaches a way to convert FPGAs into ASICs by replacing the interconnect transistors that are used with actual via connections. Similarly, Lien et al., in U.S. Pat. No. 6,301,696, granted Oct. 9, 2001, also teach techniques for replacing programmable interconnect transistors with via connections. Finally, Jones et al. teach, in U.S. Pat. No. 5,666,288, granted Sep. 9, 1997, methods for modifying libraries of cells to optimize for size, timing and power consumption.

In contrast to this prior art, embodiments of the current invention provide a method for creating models for components by modeling the set of customizable vias. In this way, techniques employed in FPGA library generation may be applied to the modeling of ASIC library elements and designs, which may be a particularly useful technique when the ASIC, such as one of those described in the prior art discussed above, has fixed interconnects with customization limited to one or more via layers.

Furthermore, the process of customizing an ASIC with a specific design such that it properly performs the function of that design is a complex task that can be prone to error. Verification of the resulting customized design is currently a computationally intensive process of extracting the circuit level design from the physical mask data and simulating with external stimuli to ensure it will function as intended. By contrast, embodiments of the current invention may provide a way to generate the circuit level design of a specific customization by exchanging unselected via models within an un-customized design with selected via models according to the customized via information.

SUMMARY OF THE INVENTION

Embodiments of the present invention may provide methods and structures, which, in addition to the teachings of the prior art, are particularly applicable to limited via mask customization of ASICs or antifuse based FPGAs. There is thus provided, in accordance with a preferred embodiment of the present invention, a method of creating a library component for a via customizable IC, which may include the steps of:
  a. extracting an un-customized model from mask data,
  b. adding unselected via models at customizable via sites,
  c. replacing unselected via models with selected via models according to via customization data for the component,
  d. creating timing and functional models for the component,
  e. verifying the timing and function of the component with the timing and functional models, and
  f. inserting timing, function and via customization data into the library for the component.

For a functional model of a design, an unselected via may contain a capacitor with zero capacitance, and a selected via model may contain a resistor with zero resistance. For a timing model, the unselected via model may contain a capacitor with the actual capacitance of the unconnected wires, and the selected via model may contain a resistor with the actual via resistance.

In another preferred embodiment of the invention, the library component may include a multiplicity of customizable vias, and step d in the method above may include combining via models into macros so as to correspond to elements used in the functional and timing models of the library component.

Also in accordance with another preferred embodiment of the present invention, there are provided methods for verifying the set of customized vias created for a design applied to a via customizable integrated circuit, which may include the steps of:
  a. generating set of customizable via sites, and
  b. comparing the set of customizable via sites with the customized vias, where the design has an error if at least one of the customized vias does not exist in the set of customizable via sites. A further embodiment of the invention may comprise a method of verifying the timing and/or the functionality of a design on a via customizable integrated circuit, which may include the steps of:
  a. expanding an un-customized design of said integrated circuit to include models of the integrated circuit's cells and routing,
  b. adding unselected via models at customizable via sites,
  c. replacing unselected via models with selected via models according to via customization data for the design,
  d. creating timing and functional models for the design, and e. verifying the timing and function of the design with the timing and functional models, where the via customizable integrated circuit may also be an antifuse based FPGA and the vias may be programmable antifuses.

BRIEF DESCRIPTION OF THE DRAWINGS

Various embodiments of the present invention will be understood and appreciated more fully from the following detailed description, taken in conjunction with the drawings, in which:

FIG. 9b is an illustration of the selected via sites for the physical interconnect in FIG. 9a;

DETAILED DESCRIPTION OF VARIOUS EMBODIMENTS

Figure 1:
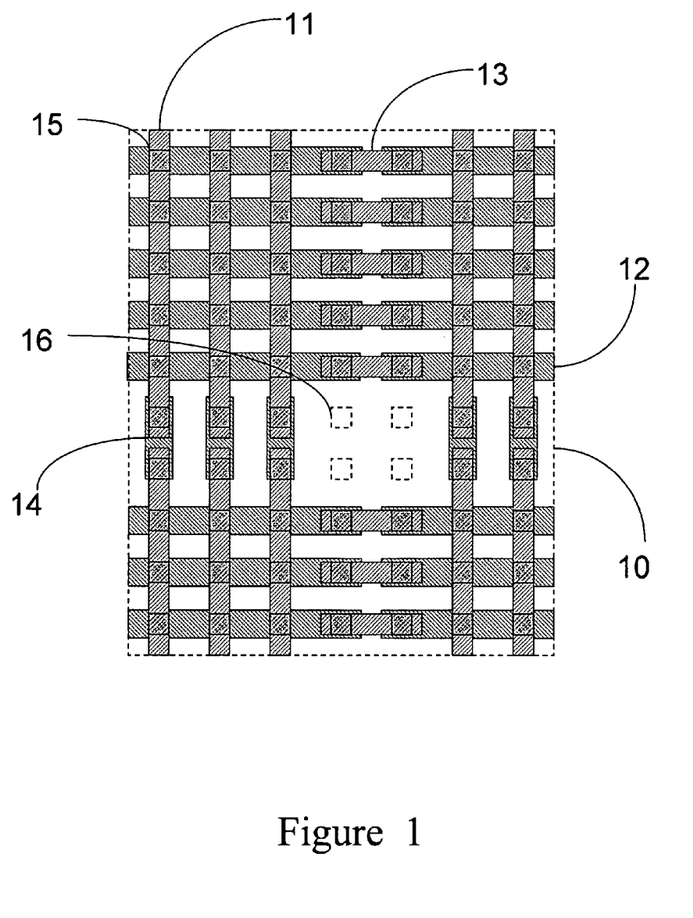
FIG. 1 is an illustration of a section of two layers of metal interconnect and the customizable via layer between them.

Reference is now made to FIG. 1, which, for simplicity, shows a small section of the interconnect structure within an exemplary customizable integrated circuit device similar to the prior art described in U.S. Pat. No. 6,331,790 by Or-Bach et al. The section 10 contains one layer comprised of vertical segments 11 and horizontal jumpers 13, a second layer comprised of horizontal segments 12 and vertical jumpers 14, and a set of customizable via sites 15, which does not include possible via sites 16, that do not reside between jumpers or segments on the two layers. In a preferred embodiment of the present invention, the set of customizable via sites, derived by intersecting the set of wire segments above and below the customizable via layer, may be used to verify the correct placement of vias used for customizing a specific design.

Figure 2:
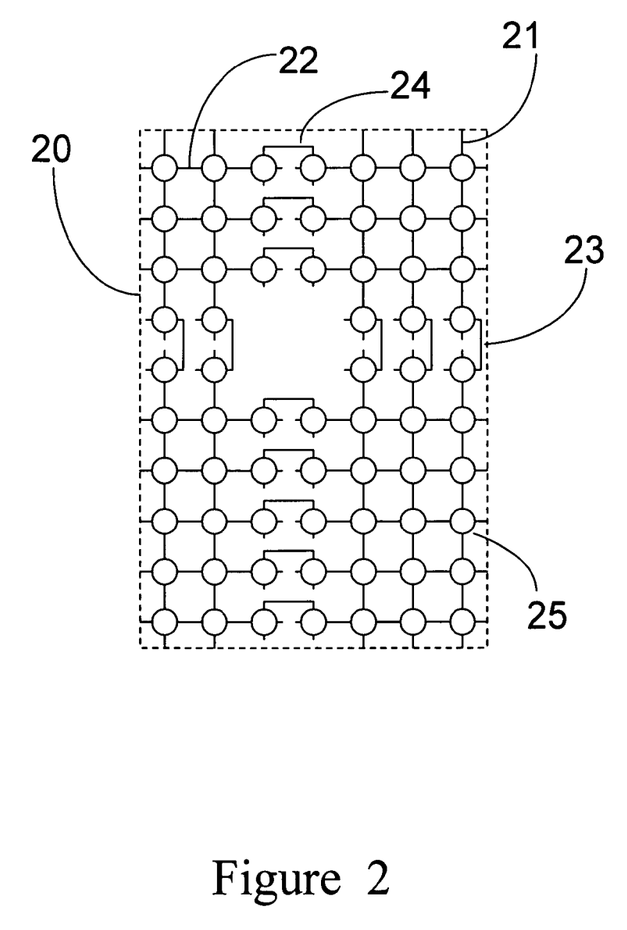
FIG. 2 is a simplified illustration of two layers of interconnect and the customizable via locations between them.

Reference is now made to FIG. 2, which is an abstraction of FIG. 1, of a section 20 of the interconnect segments and via sites within a customizable integrated circuit, which also contains vertical segments 21, vertical jumpers 24, horizontal segments 22, and horizontal jumpers 23, connectable by selecting one or more via sites 25, where the via sites are placed between a vertical and horizontal interconnect. To signify the interconnection of metal from two layers the ends of the jumpers 23 and 24, are drawn in the direction of the segments on the layer the jumpers reside on. In this way a schematic representation of the physical wire segments and via sites may be created.

Figure 3:
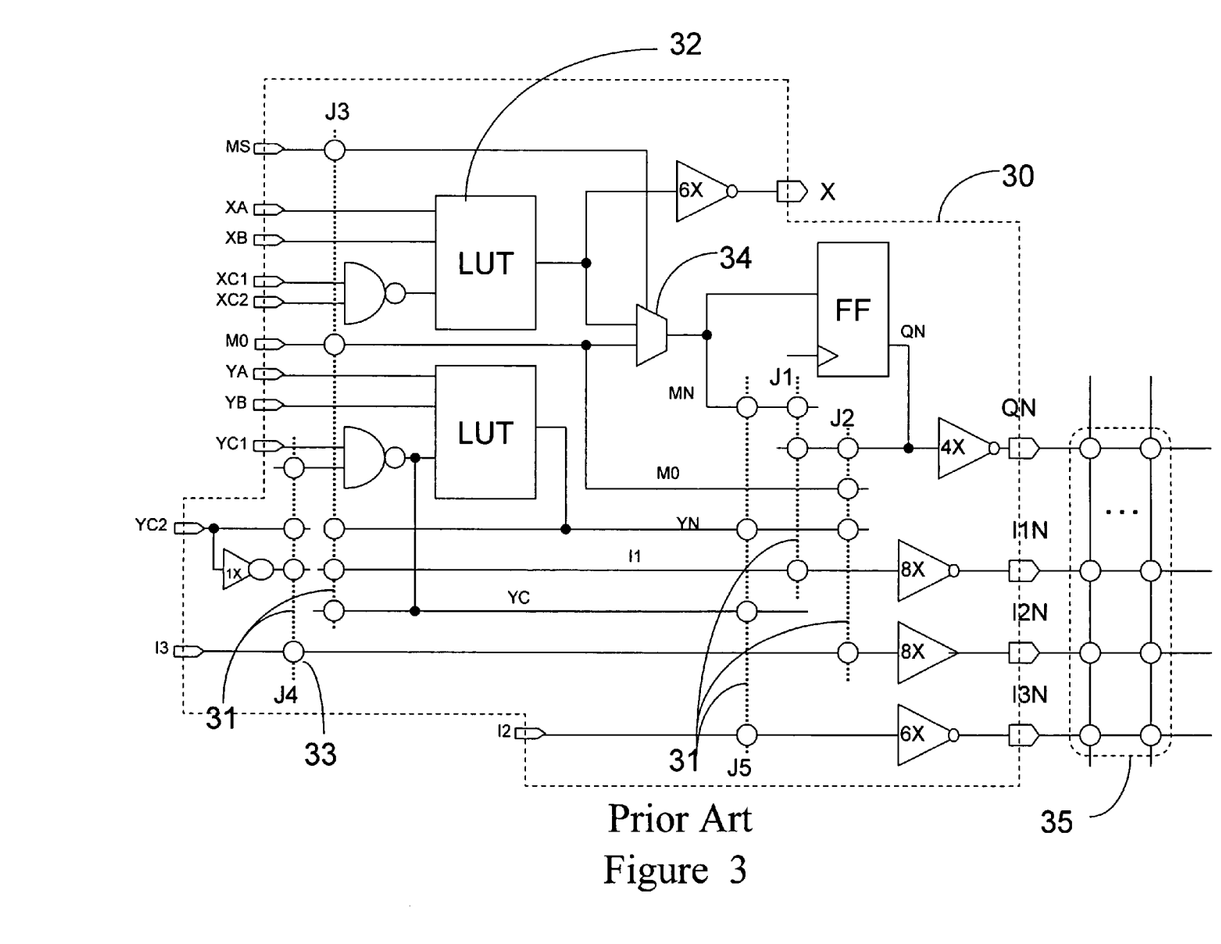
FIG. 3 is an illustration of a customizable and programmable logic cell.

Reference is now made to FIG. 3, which is a detailed illustration of the customizable via sites of a customizable and programmable logic cell as previously described in U.S. Pat. No. 6,331,790 by Or-Bach et al. The cell 30 consists of input and outputs on the boundary of the cell, blocks, such as a 3-input LUT 32, simple gates such as a two-input multiplexer 34, jumpers 31 and via sites for connecting the input/output (I/O) and internal components together. In this fashion a schematic of the components and via sites of a customizable and programmable logic cell may be created.

Typically, a standard or un-customized portion of a via customizable ASIC is constructed by creating a core comprised of an array of customizable logic cells that may be similar to the one shown in FIG. 3, a (possibly repeating) customizable metal interconnect fabric that may be similar to that shown in FIGS. 1 and 2, which may be bounded by a similarly customizable set of I/O cells and possibly other complex cells, such as customizable memory. The process of customizing such ASICs to perform the function of a specific register transfer level (RTL) design may include:

(1) synthesizing the RTL design into a gate level design,
(2) mapping the gate level functions into the customizable cells that exist on the ASIC,
(3) creating a netlist comprised of such customizable cells and a corresponding interconnect fabric,
(4) place and routing the cells and interconnect fabric, and
(5) creating a corresponding set of via masks for customizing the cells and interconnect fabric on the ASIC, such that the customized ASIC will perform the function of the original RTL design.

The process of implementing a customization flow that correctly implements a custom design on a standard ASIC template is a complex task that may be prone to the introduction of errors. These errors may be in the form of incorrect function, incorrect timing and/or incorrect placement of vias on one or more customized designs. It is therefore desirable to both automatically generate as much of the underlying templates and library information for the customization flow from the design of the standard ASIC, and to verify as much of the resulting customized ASIC as possible. In a preferred embodiment of the present invention, such verification may be accomplished by placing models for selected and unselected vias in the via sites of a design of the standard ASIC according to the customization of the ASIC and using the corresponding model to verify the correctness of the specific customization.

Figure 4A:
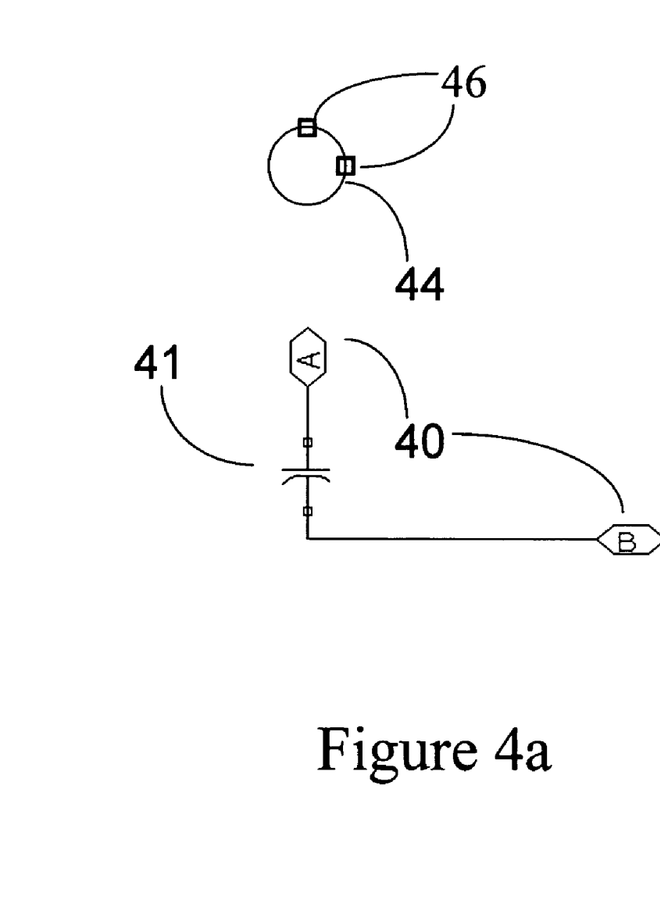
FIG. 4a is an illustration of a circuit model for an unselected via site.

Reference is now made to FIG. 4a, an illustration of a model of an unselected via. The model may have two terminals 40 and a capacitor 41, which electrically appears to be an open or non-interconnecting via. For functional modeling, the capacitor may be set to zero farads, or the capacitor may be set to the equivalent capacitance of the parallel plates created by the overlap of the metal segments above and below the unselected via's location for accurate RC timing. The model's symbol 44 with its two terminals is also shown above the model.

Figure 4B:
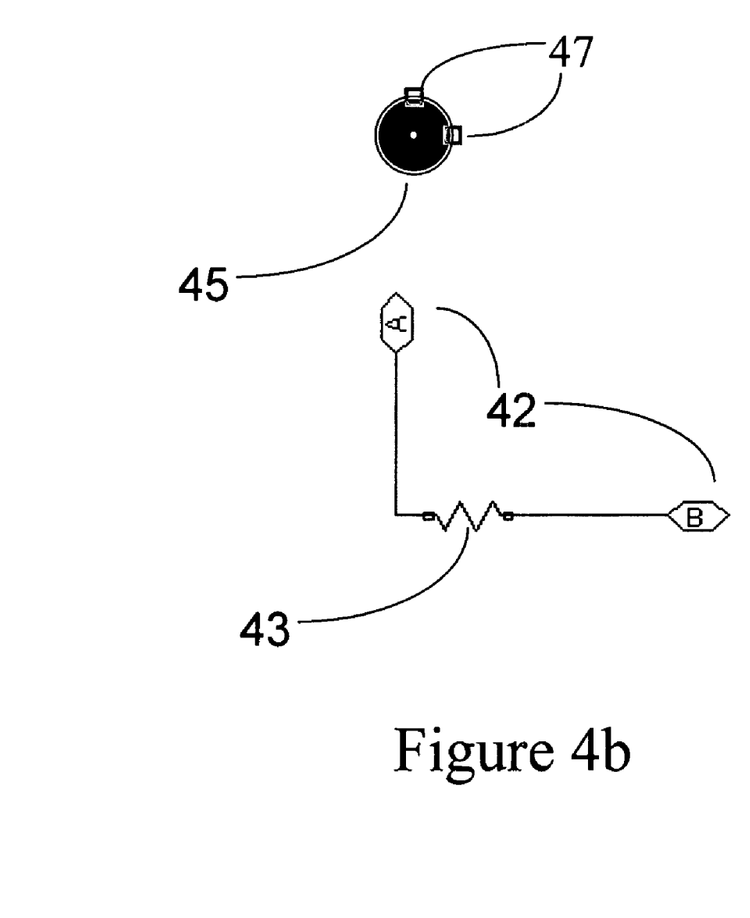
FIG. 4b is an illustration of a circuit model for a selected via site.

Reference is now made to FIG. 4b, an illustration of a model of a selected via. The model may have two terminals 42 and a resistor 43, which acts as a short that is electrically equivalent to a via between the segments. For functional modeling, the resistor may be set to zero ohms, or the resistor may be set to the equivalent resistance of the via for accurate RC timing. The model's symbol 45 with its two terminals is also shown above the model.

Figure 5:
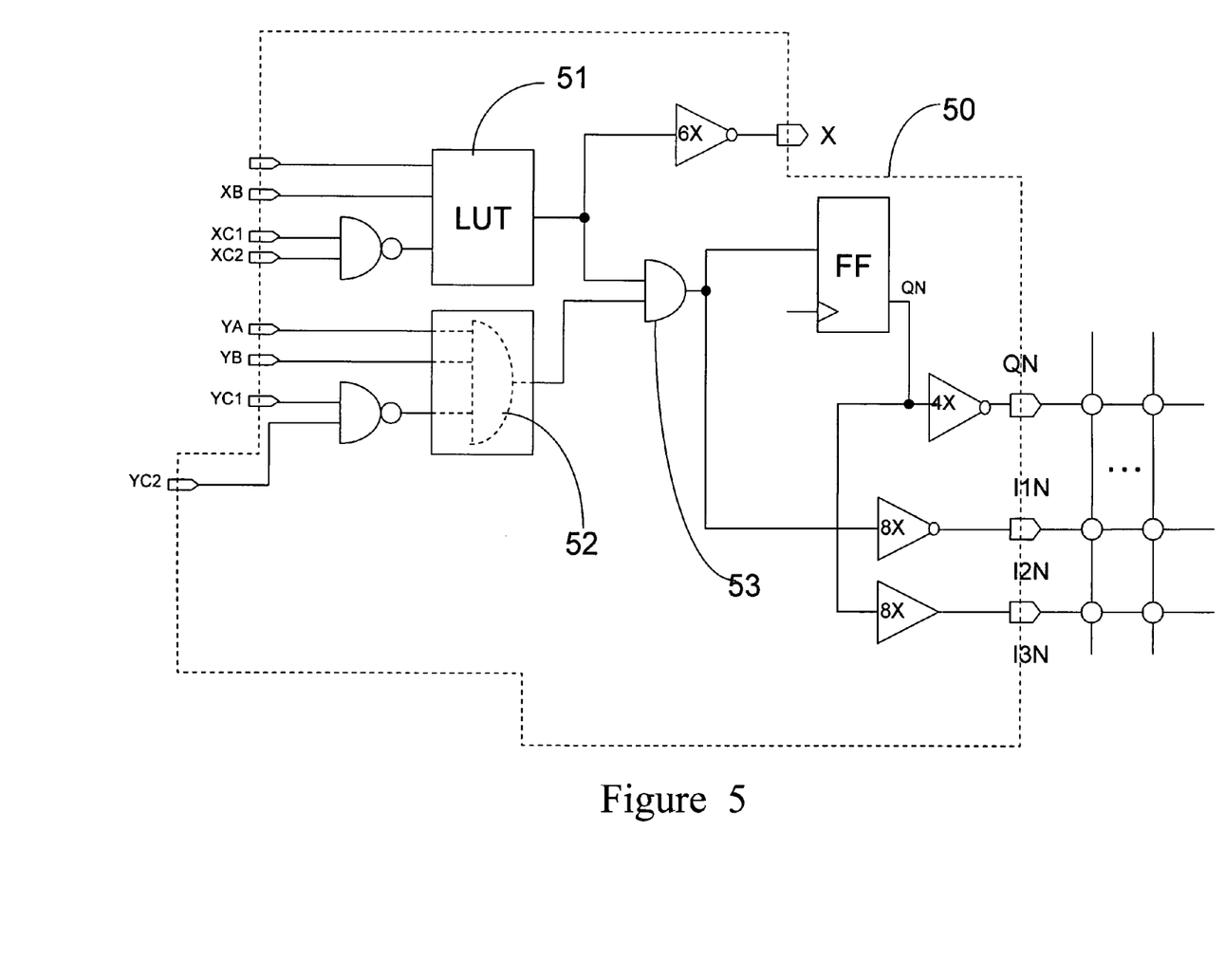
FIG. 5 is an illustration of a customized logic cell design.

Reference is now made to FIG. 5, a detailed illustration of a specific customization of the cell shown in FIG. 3. The cell 50 is an example of a function mapped into a cell. The example consists of two programmable LUTs 51, one of which contains an AND function 52, and an AND gate 53, connected to other components in the cell.

Figure 6:
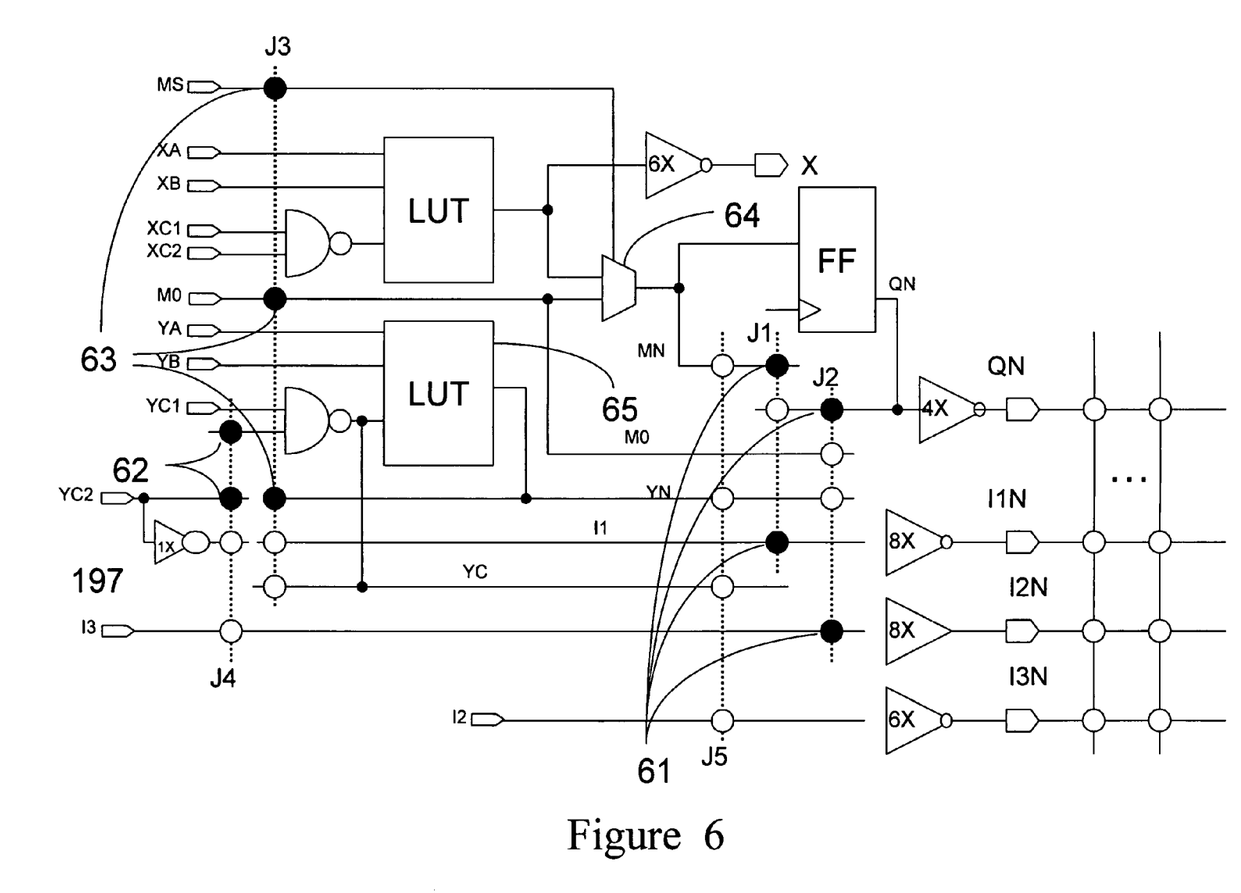
FIG. 6 is an illustration of FIG. 5 with selected via sites.

Reference is now made to FIG. 6, an illustration of a set of vias selected to implement the cell function in FIG. 5. Some selected via locations 62 connect an input terminal to a component in the cell. Other selected via locations 61 connect internal components to output buffers, and still other selected via locations 63 convert the inputs of the multiplexer into a two-input AND function, equivalent to the AND function 53 in FIG. 5. In this manner, a schematic of the cell function can be created by applying selected via models to the customization via locations of a standard logical cell schematic.

Typically, the LUTs are programmed after customization, but they may also be customized. In this case, the LUT 65 in FIG. 6 may contain the three-input AND 52 in FIG. 5.

Figure 7:
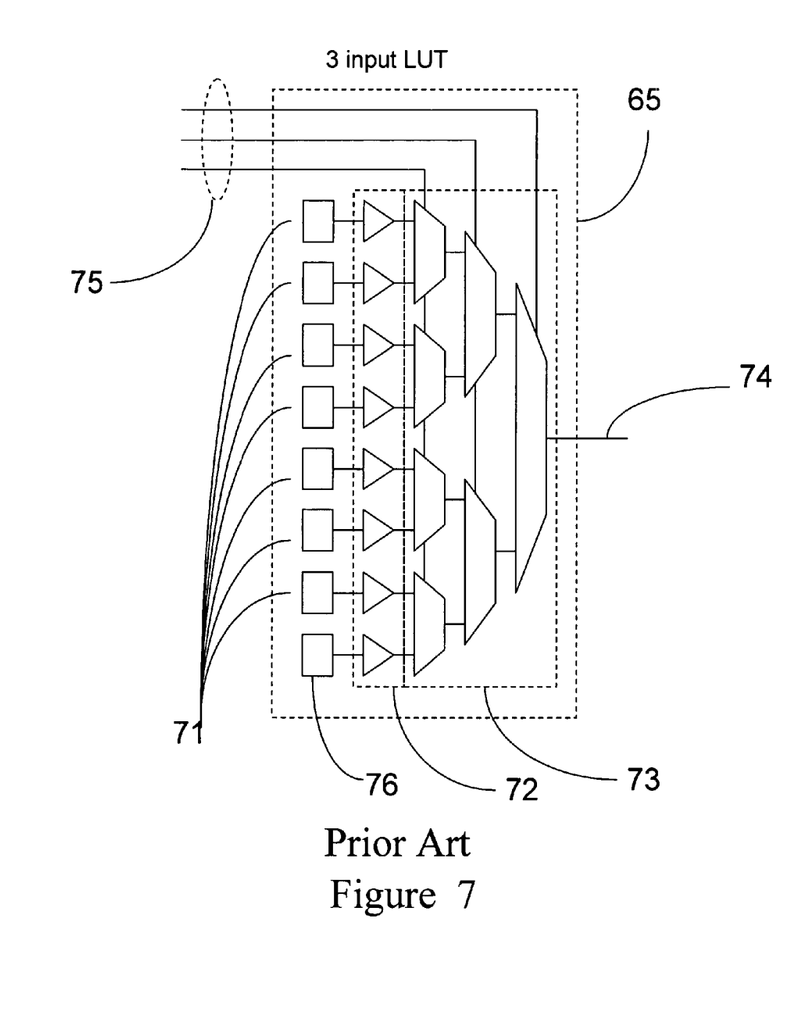
FIG. 7 is an illustration of a 3-input look-up table (LUT)

Reference is made to FIG. 7, a detailed diagram of a three-input LUT. Further expansion of the LUT 65 in the cell design in FIG. 6 yields the 3 inputs 75, driving a series of multiplexers 73, which selects one of the buffered outputs 72 from a set of eight bits 71 and 76 to drive the LUT output 74. To implement the AND function 52 in FIG. 5, seven of the bits 71 may be set to zero, and one bit 76 may be set to one. Typically, this is programmed into the LUT, which is shown customized to contain 8 memory cells.

Figure 8A:
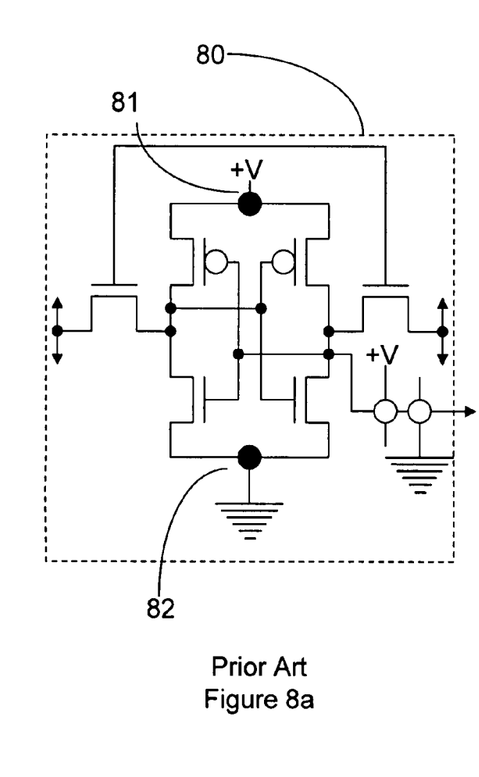
FIG. 8a is an illustration of a programmable bit of a LUT.
Figure 8B:
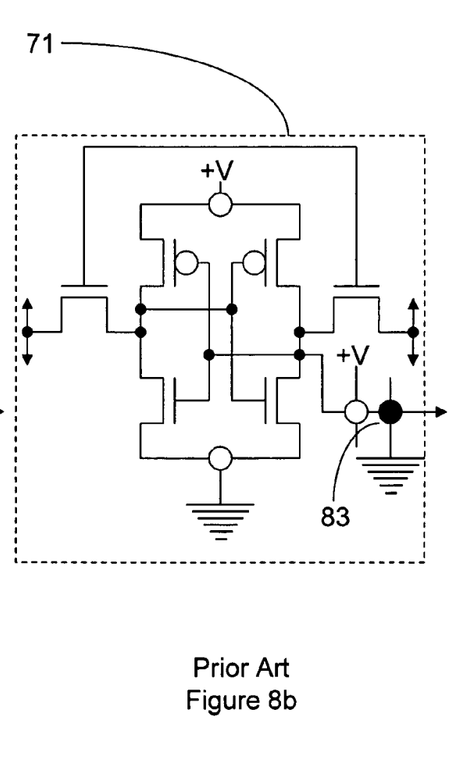
FIG. 8b is an illustration of a programmable bit of a LUT customized to zero.
Figure 8C:
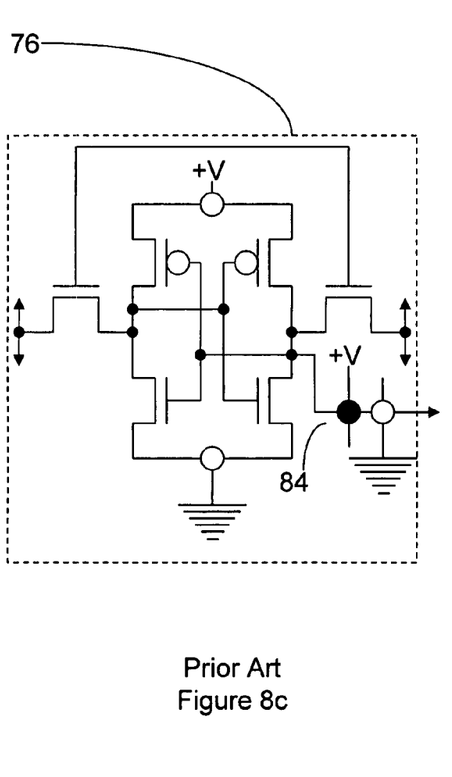
FIG. 8c is an illustration of a programmable bit of a LUT customized to one.

Reference is now made to FIG. 8*a*. The customization of a memory cell to function as memory cell 80 may comprise selecting two vias 81 and 82 to power the memory cell. Reference is now made to FIG. 8*b*, a customization of a memory cell to always output a logical zero, and to FIG. 8*c*, a customization of a memory cell to always output a logical one. The aforementioned AND function may be customized by tying the output of the memory cells 71 in FIG. 7 to ground by selecting the via 83 shown in FIG. 8*b*, and setting the output of the memory cell 76 to +V by selecting the via 84 shown in FIG. 8*c*.

So, in yet another preferred embodiment of the present invention, configuration information, which is typically loaded into a memory element within a cell of a customizable and programmable IC, may be converted into via customization information that is used to verify the programmable portion of a design.

For designs that map into more than one cell, there may exist placed and routed interconnects between the cells in the design. Such a routed interconnect fabric may include a series of connected segments.

Figure 9A:
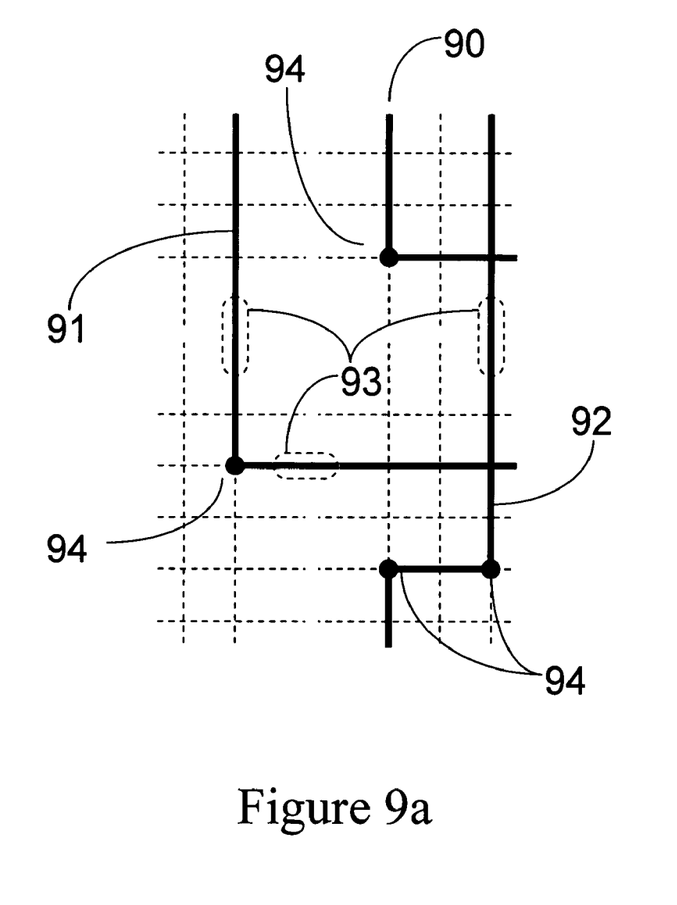
FIG. 9a is an illustration of physical interconnect of segments shown in FIG. 1.

Reference is now made to FIG. 9*a*, a diagram of three routed interconnects 90, 91 and 92. Each routed interconnect includes at least one via 94 between two or more fixed segments. Some interconnects have logical segments that extend across two physical segments that may be joined together where jumpers exist 93. This routed interconnect description is translated into a set of selected vias when creating a via customization file.

Figure 9B:
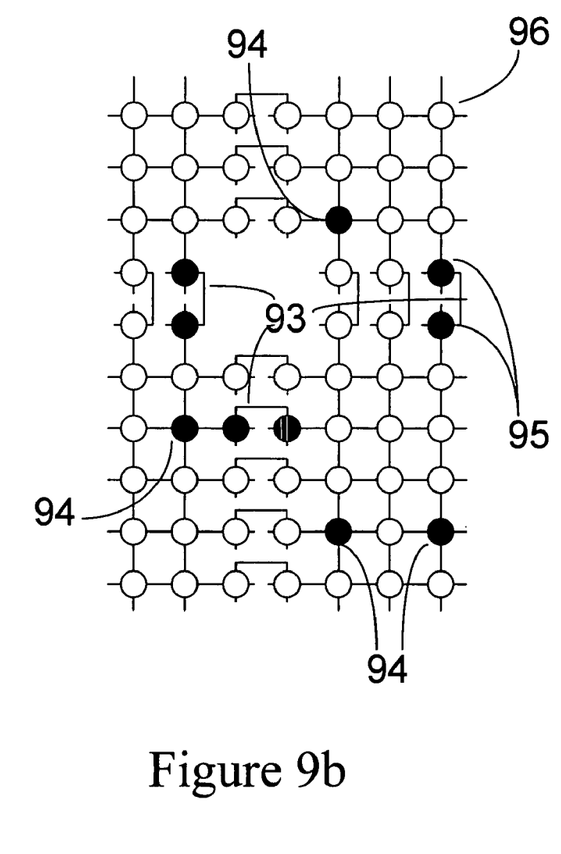

Reference is now made to FIG. 9*b*, a diagram of the standard segments and via locations of a section of metal interconnect on a standard ASIC, with selected vias which correspond to the routed interconnect in FIG. 9*a*. A set of selected vias 94 define the connections between fixed horizontal and vertical segments corresponding to the via locations of the routed interconnect. Pairs of selected vias 95, connect segments end to end with jumpers 93 on the alternate layer equivalent to the interconnect's routing in FIG. 9*a*. In this manner, the logical interconnect can be translated into a schematic by applying selected via models to a standard interconnect schematic in the locations specified in a via customization file.

As such, if a model of the segments and the cells was created to include the unselected via model in the unselected via locations and the selected via model in the selected via locations, such a model could be converted into a net list for either detailed functional or detailed timing verification of the subsequent design.

Figure 10:
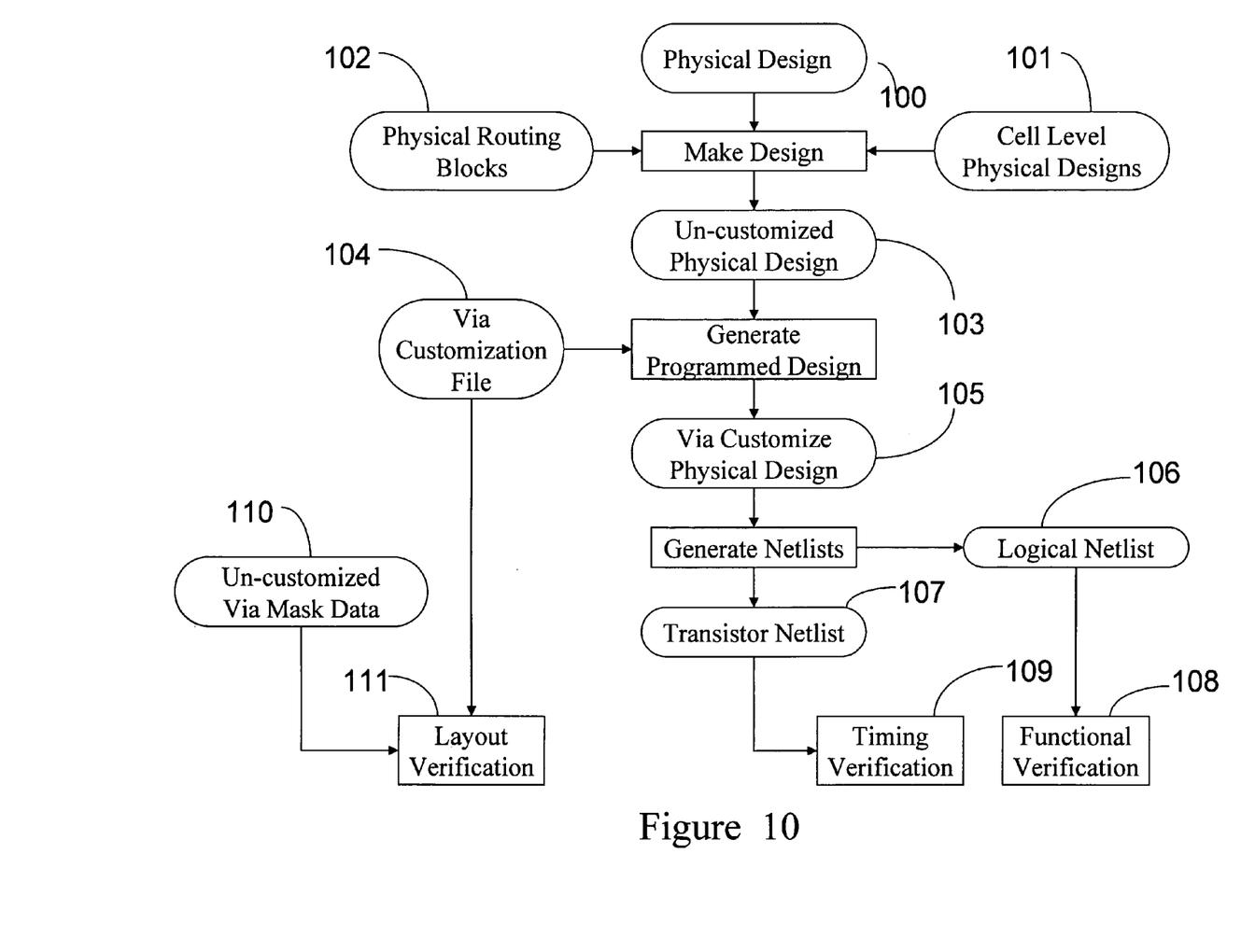
FIG. 10 is a block diagram of a process to verify a customizable design.

Reference is now made to FIG. 10, a block diagram of the process to verify a custom design. The process begins with a physical design 100 of a cell, multiple cells, a portion of an un-customized chip, or an entire un-customized chip. Typically, these are the top-level designs, created during the process of designing the actual standard ASIC chip. The detailed physical designs of the cells 101 may typically include all the components and via sites of the cell. Typically, these are created during the design of the actual standard ASIC chip, but they may, alternatively, be created by netlist extraction from mask data, substituting for the un-customized vias with unselected via models. The specific types referenced in the physical design are added to the design, along with the designs of the routing blocks 102 referenced in the physical design. The result is an un-customized physical design 103 that includes all the segments, jumpers and unselected via models in all the legal via sites. Separately, a via customization file 104 may be created manually for single cell designs or by the customizing flow described above for larger designs. The via customization file 104 contains a list of via locations. The un-customized physical design 103 is then expanded to include selected via models for the locations in the via customization file 104, and unselected via models for the rest of the via locations in the un-customized physical design 103. The instances of cells, blocks or I/O may be replicated to allow for different customization. Following customization of each of the cells, blocks, I/O and routing, groups of cells, blocks and I/O with the same customization may be combined to form common macros. One or more groups of commonly customized cells, blocks, and/or I/O may result in one or more respective macros. The result is a via customized physical design 105, which may hierarchically contain a top-level design and one or more referenced macros (an example of how such macros may be created and used is shown in FIG. 11, as discussed below). From this file, either a logical net list 106 or a transistor net list 107 may be generated, which may be used to perform functional verification 108 or detailed timing verification 109. Additional stimulus files that may be used for functional verification and back-annotation files that may be used for timing verification are not shown in this diagram. Typically, these files are, respectively, in Verilog and Spice formats, but other formats are also possible. Optionally, the unused logic and unconnected segments in the via customized design 105 may be eliminated when generating the logical and transistor netlists.

Separately, layout verification may be done by comparing the un-customized via mask data 110, which contains the set of customizable via sites and is derived from the intersection of the metal segments above and below the customized via layer, with the via mask data created from the via customization File 104. The result is in error if the intersection of these two sets of data is not identical to the created via mask data.

In yet another preferred embodiment of the present invention, a process of:

a. combining un-customized cell and routing schematics into a un-customized physical design,
b. replacing unselected via models with selected via models according to via customization data,
c. recombining equivalent instances of customized cells,
d. generating simulation and timing netlists, and
e. performing functional and timing verification may be used to verify a design.

Furthermore, in yet another embodiment of the present invention, the timing and functional models created using the above process may be added to the library of components for use in the construction and verification of designs to be customized on the standard ASIC.

It is further contemplated that such via models may also be used to model anti-fuse or other via like programmable elements within FPGAs or customizable and programmable ICs.

It is also contemplated that multiple via models may be combined into a single macro to depict more complicated programmable interconnect fabrics. This is useful when such macros are primitive elements in the larger functions used in designs that are customized and programmed into the array of logic cells.

Figure 11A:
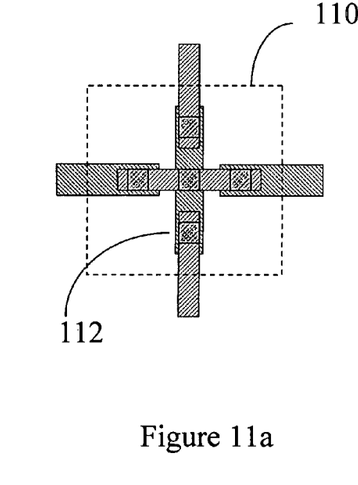
FIG. 11, comprised of FIGS. 11a, 11b, and 11c, illustrates the use of an interconnect macro containing multiple via sites.
Figure 11B:
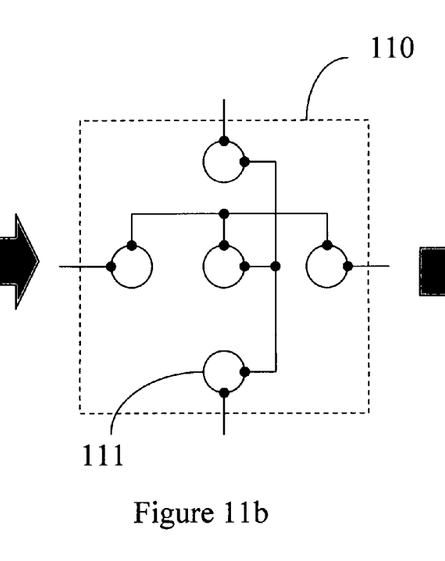
Figure 11C:
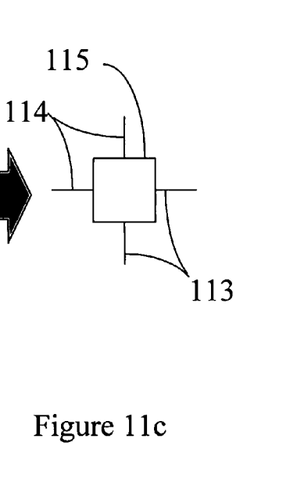

Reference is now made to FIG. 11, comprising FIGS. 11a, 11b, and 11c. FIG. 11a is an example of customized vias that connect four segments together. FIG. 11b is a diagram depicting via models corresponding to the customized vias in FIG. 11a, and FIG. 11c is an abstract interconnect element 115 that corresponds to the macro 110 shown in FIGS. 11a and 11b. These figures show how a complex four terminal interconnect element 115 may be constructed out of multiple two terminal via models 111, each of which corresponds to a customizable via site 112 in the actual interconnect layers. Such an element may be used to approximate the interconnect options used in a full custom routing when the actual customization is limited to vias between fixed segments, since not all combinations of the terminals maybe connected together. For example, either the terminals 113 or the terminals 114 maybe connected together, but both cannot be connected together at the same time.

It is further contemplated that via models may be applicable to more than two layers of interconnect and that such multi-layered via models may be combined into macros for the purposes of depicting multi-layer interconnect.

It will be appreciated by persons skilled in the art that the present invention is not limited by what has been particularly shown and described hereinabove. Rather the scope of the present invention includes both combinations and sub-combinations of various features described hereinabove as well as modifications and variations which would occur to persons skilled in the art upon reading the foregoing description and which are not in the prior art.

We claim:

1. A method of modeling designs customized in via-customizable integrated circuits, comprising:

automatically creating a set of legal via sites by determining all intersections of user configurable metals adjacent to a via programmable layer and performing design rule checks to determine the legality of each via site;
placing a model of an unselected via at a via sites in said set of legal via sites in a customizable integrated circuit; and
replacing each model of an unselected via with a model of a selected via at customizable via sites to be utilized in a design to customize the customizable integrated circuit.

2. A method as in claim 1 wherein said unselected via model for a functional model contains a capacitor with zero capacitance, and said selected via model for said functional model contains a resistor with zero resistance.

3. A method as in claim 1 wherein said unselected via model for a timing model contains a capacitor with actual capacitance of the unconnected wires, and said selected via model for said timing model contains a resistor with actual via resistance.

4. A method of creating a library component for a via customizable integrated circuit, comprising:
performing the method according to claim 1, wherein said design corresponds to a portion of said via customizable integrated circuit.

5. The method according to claim 4, further comprising:
creating for said via customizable integrated circuit at least one model selected from the group consisting of a timing model and a functional model;
using said at least one model to verify, for said via customizable integrated circuit, at least one characteristic selected from the group consisting of timing of the via customizable integrated circuit and function of the via customizable integrated circuit; and
creating said library component for said via customizable integrated circuit based on via customization data corresponding to said via customizable integrated circuit.

6. The method according to claim 5, wherein said creating said library component further comprises:
inserting into said library component for said via customizable integrated circuit at least one type of data selected from the group consisting of timing data of the via customizable integrated circuit and function data of the via customizable integrated circuit.

7. The method according to claim 5, wherein said library component for said via customizable integrated circuit comprises a multiplicity of customizable vias, and wherein said creating at least one model comprises:
combining said models of selected vias and unselected vias into at least one macro corresponding to an element used in at least one model selected from the group consisting of said timing model and said functional model.

8. A method as in claim 1, wherein said via customizable integrated circuit is an antifuse based FPGA, and wherein said vias are programmable antifuses.

* * * * *